(12) United States Patent
Hattori et al.

(10) Patent No.: US 9,903,407 B2
(45) Date of Patent: Feb. 27, 2018

(54) FASTENER

(71) Applicant: PIOLAX, INC., Yokohama-shi (JP)

(72) Inventors: Ryu Hattori, Yokohama (JP); Hiroshi Nakazato, Yokohama (JP)

(73) Assignee: PIOLAX, INC., Yokohama-Shi, Kanagawa (JP)

(*) Notice: Subject to any disclaimer, the term of this patent is extended or adjusted under 35 U.S.C. 154(b) by 92 days.

(21) Appl. No.: 15/032,590

(22) PCT Filed: Oct. 27, 2014

(86) PCT No.: PCT/JP2014/078467
§ 371 (c)(1),
(2) Date: Apr. 27, 2016

(87) PCT Pub. No.: WO2015/064525
PCT Pub. Date: May 7, 2015

(65) Prior Publication Data
US 2016/0252127 A1 Sep. 1, 2016

(30) Foreign Application Priority Data

Oct. 29, 2013 (JP) .................... 2013-224446
Apr. 18, 2014 (JP) .................... 2014-086350

(51) Int. Cl.
*F16B 37/04* (2006.01)
*F16B 37/02* (2006.01)

(52) U.S. Cl.
CPC .......... *F16B 37/043* (2013.01); *F16B 37/02* (2013.01)

(58) Field of Classification Search
CPC ...................................... F16B 37/02
(Continued)

(56) References Cited

U.S. PATENT DOCUMENTS 2,408,153 A * 9/1946 Steans .............. F16B 37/02
411/259
3,426,817 A * 2/1969 Andrews .......... F16B 37/043
411/173
(Continued)

FOREIGN PATENT DOCUMENTS

JP     S 57-182624 U    11/1982
JP     S 62-124309 U    8/1987
(Continued)

OTHER PUBLICATIONS

International Search Report (ISR) (PCT Form PCT/ISA/210), in PCT/JP2014/078467, dated Dec. 2, 2014.
(Continued)

*Primary Examiner* — Gary W Estremsky
(74) *Attorney, Agent, or Firm* — McGinn IP Law Group, PLLC.

(57) ABSTRACT

A fastener includes: a first leg part; a second leg part; a coupling part coupling one ends of the first leg part and the second leg part; a first head part and a second head part which are provided with a flange for engaging with a front-side edge of an attachment hole, and a pressing surface for a user to press, and which are provided to other ends of the first leg part and the second leg part; and a screw hole formed in the second head part, and into which a screw member is screwed. The first leg part includes a first engagement part capable of engaging with a rear-side edge of the attachment hole. The second leg part includes a second engagement part capable of engaging with the rear-side edge of the attachment hole.

9 Claims, 11 Drawing Sheets

(58) Field of Classification Search
USPC .................................. 411/182, 520, 522–524
See application file for complete search history.

(56) References Cited

U.S. PATENT DOCUMENTS

| | | | | |
|---|---|---|---|---|
| 3,726,179 | A * | 4/1973 | Friese, Jr. | ............... F16B 37/02 |
| | | | | 411/523 |
| 6,908,274 | B1 * | 6/2005 | Vassiliou | ................ F16B 37/02 |
| | | | | 411/173 |
| 2012/0125960 | A1 | 5/2012 | Diez Herrera | |

FOREIGN PATENT DOCUMENTS

| | | |
|---|---|---|
| JP | H 11-342802 A | 12/1999 |
| JP | 2001-234908 A | 8/2001 |
| JP | 2008-144782 A | 6/2008 |

OTHER PUBLICATIONS

Japanese Office Action in Japanese Application No. 2015-544980 dated Jun. 20, 2017 with an English translation thereof.

* cited by examiner

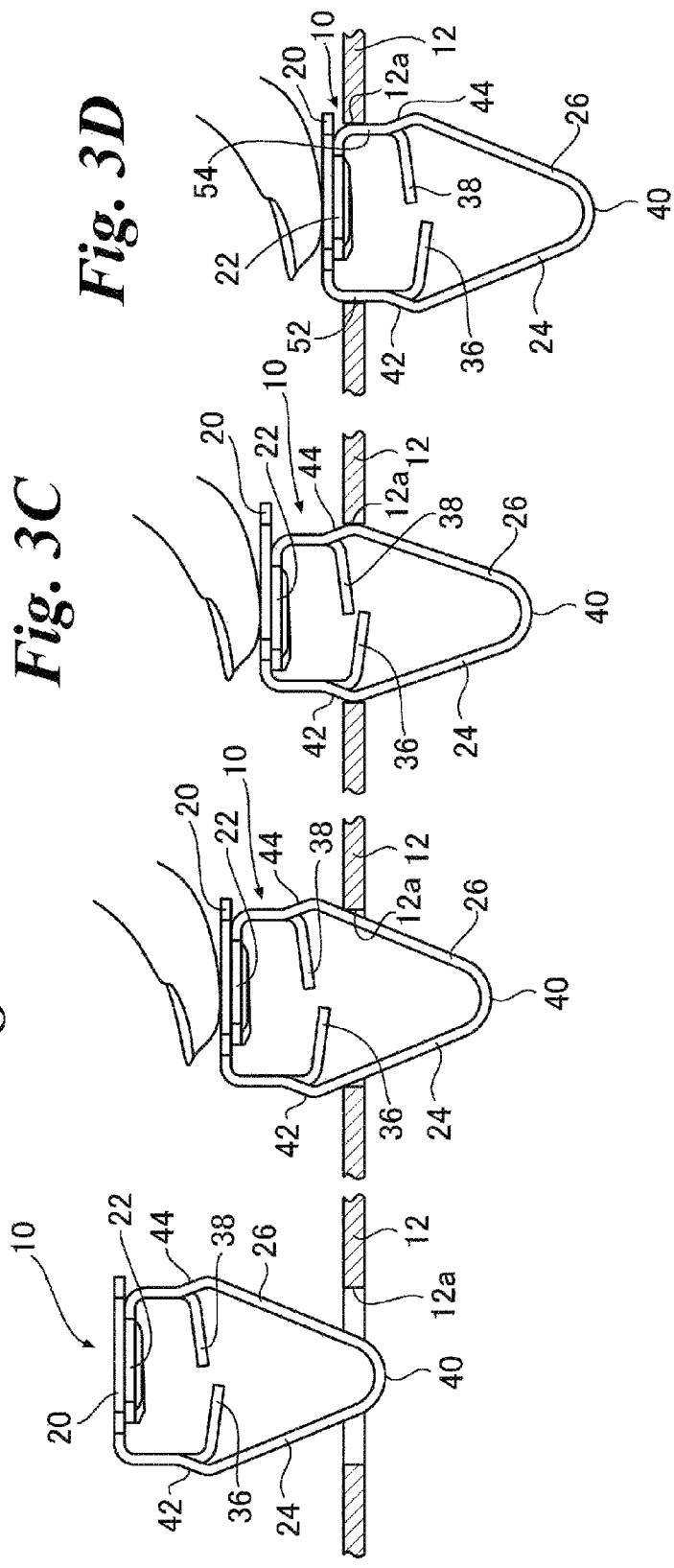

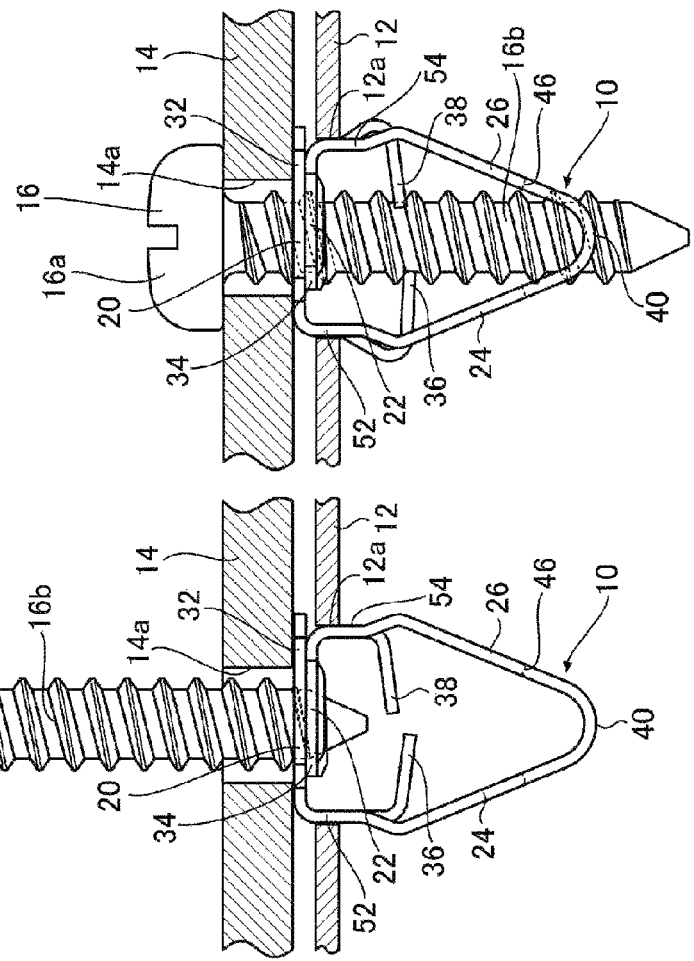

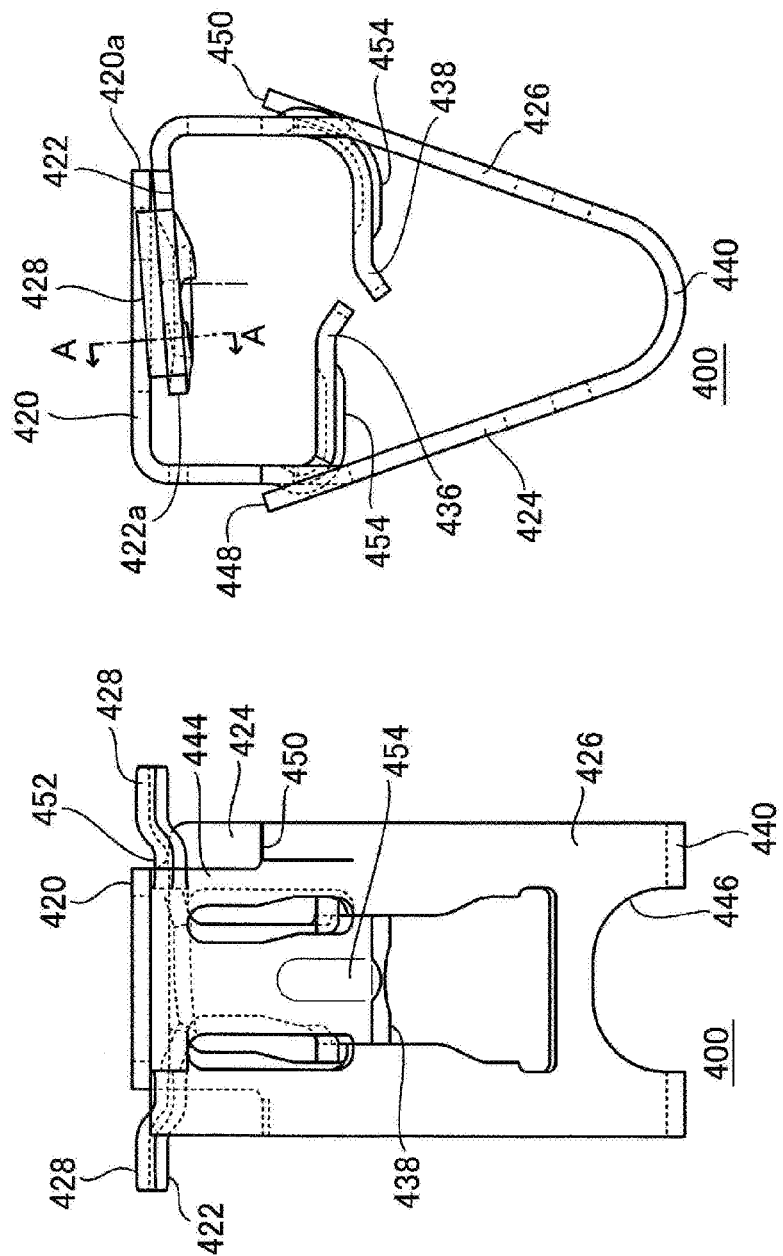

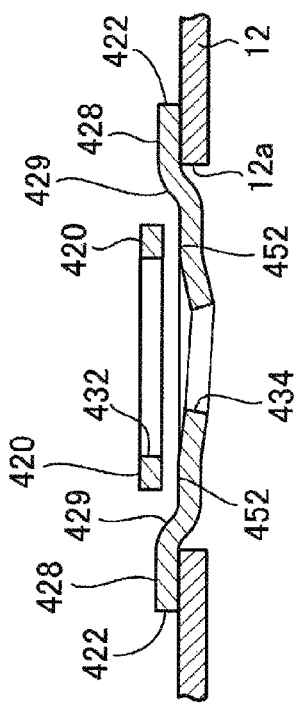
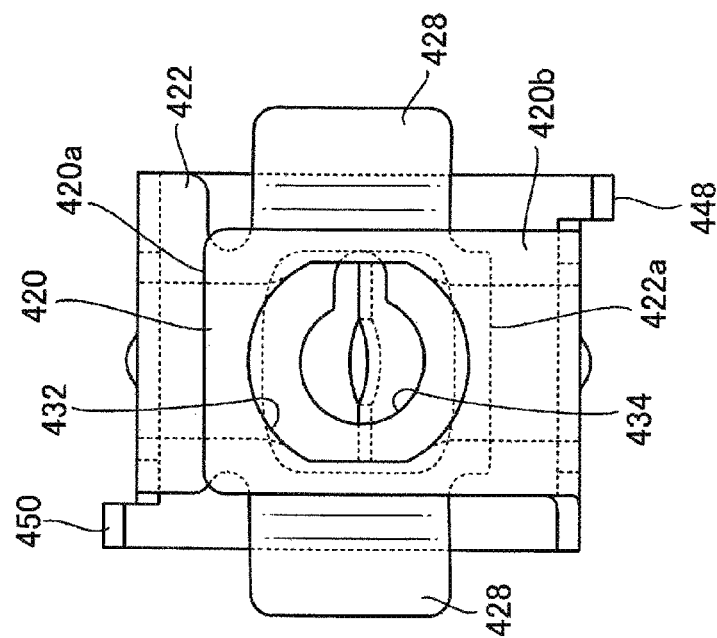
Fig. 8B
Fig. 8A

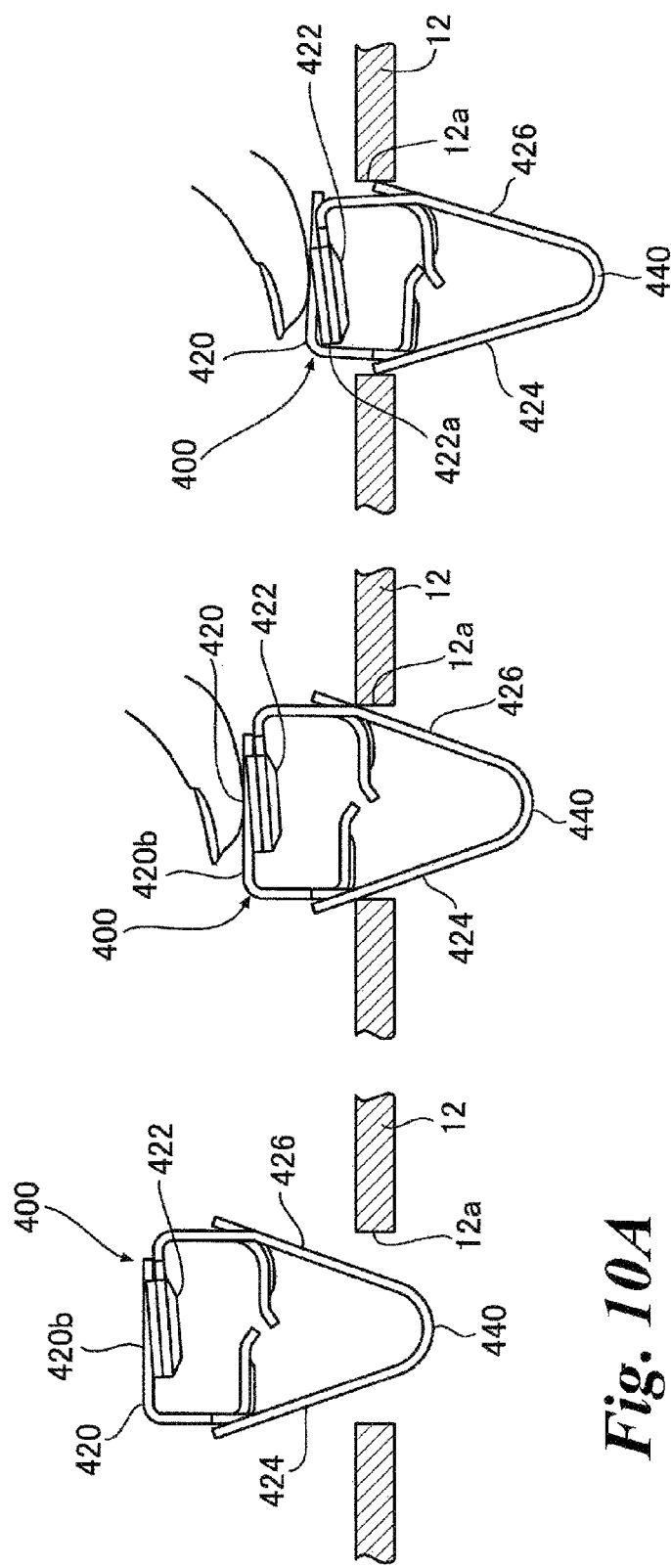

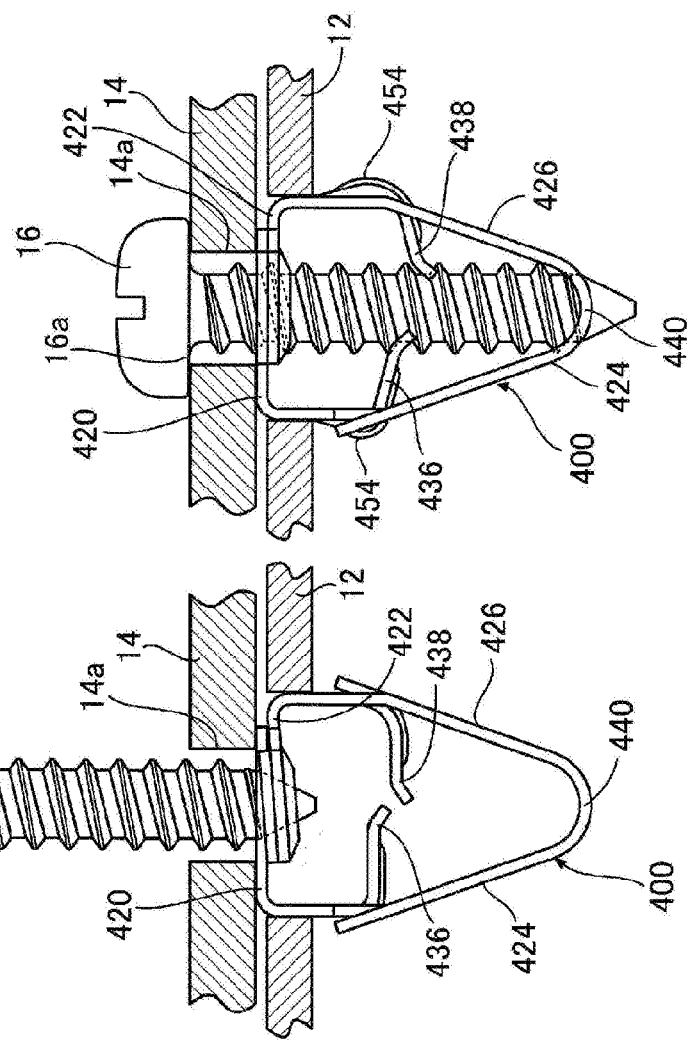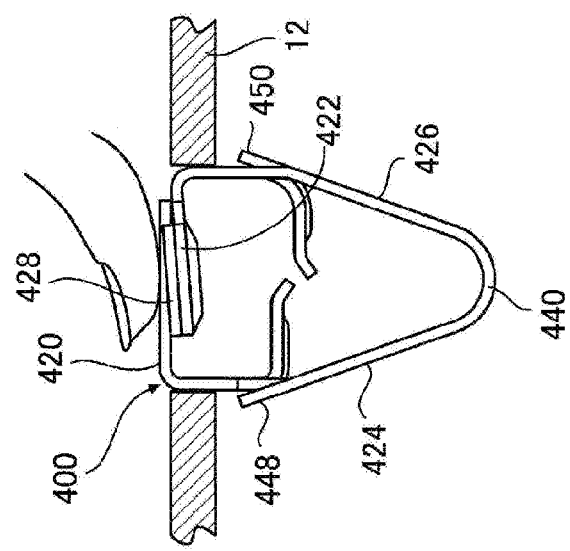

FASTENER

TECHNICAL FIELD

The present invention relates to a fastener capable of assembling predetermined members using a screw member.

BACKGROUND ART

Fasteners are used in a vehicle in order to attach a variety of parts to a vehicle body panel. For example, PTL 1 discloses a fastener for fastening a vehicle trim to a vehicle body panel via a screw. The fastener is of a monolithic construction made of an elastic sheet metal such as a spring steel plate, and configured to fasten a vehicle trim with the use of a screw, whereby the vehicle trim can be fastened firmly.

The fastener in PTL 1 includes a top plate portion including a screw hole and a flange, and a pair of leg pieces drooping from the corresponding side edges of the top plate portion. The pair of leg pieces are expandingly opened by abutting on a screw that is inserted into the screw hole so as to be engaged with a mounting hole of the vehicle body panel. When the fastener is temporarily attached to the mounting hole of the vehicle body panel, the pair of leg pieces are bent to be inserted into the mounting hole.

CITATION LIST

Patent Literature

PTL 1: JP-2008-144782-A

SUMMARY OF THE INVENTION

Problem that the Invention is to Solve

In the fastener in PTL 1, the pair of leg pieces cannot be easily bent when inserted into the mounting hole, and thus need to be pressed in with great force. This is because the portions of the leg pieces, with which the back side of the mounting hole is engaged, depend on the thickness of the vehicle body panel. Therefore the portions of the leg pieces are likely to be provided close to the top plate portion. For this reason, when the leg pieces are bent by being inserted into the mounting hole, the fulcrum points of the leg pieces become end portions of the top plate portion, and the points of load become close to the top plate portion. Thus, the lengths between the fulcrum points and the points of load become almost equal to the thickness of the vehicle body panel, which causes the leg pieces not to be easily bent.

The present invention is made in view of the above problems, and an object of the present invention is to provide a fastener capable of being easily inserted into a mounting hole.

Means for Solving the Problem

To solve the above-mentioned problem, an aspect of the present invention provides a fastener that is attached to a mounting hole of a first member and to which a second member is attached using a screw member, the fastener including: a first leg portion having elasticity; a second leg portion having elasticity, and being provided to be opposed to the first leg portion; a connecting portion connecting one end of the first leg portion and one end of the second leg portion; a head portion including a flange to be engaged with an edge of the mounting hole on a top side thereof, and a pressing surface to be pressed by a user, the head portion being disposed on the other ends of the first leg portion and the second leg portion so as to be opposed to the connecting portion; and a screw hole portion into which the screw member is screwed, the screw hole portion being disposed in at least one of the connecting portion and the head portion. The first leg portion includes a first engagement portion engageable with an edge of the mounting hole on a back side thereof, and the second leg portion includes a second engagement portion engageable with the edge of the mounting hole on the back side thereof.

According to the present embodiment, the pressing surface can be easily pressed in with a finger when the fastener is inserted into the mounting hole. In addition, since the one end of the first leg portion and the one end of the second leg portion are connected with the connecting portion, and the leg portions include the first engagement portion and the second engagement portion, the distance between the connecting portion and the head portion can be sufficiently secured, whereby the lengths of the leg portions are secured, allowing the leg portions to be easily bent. Thus, the leg portions are easily bent when the engagement portions pass through the mounting hole, which can reduce the required press force. For example, the first member defines a vehicle body panel and the second member defines an interior member; however, the present invention is not limited to this example.

Advantageous Effects of Invention

According to the present invention, a fastener can be easily inserted into a mounting hole.

BRIEF DESCRIPTION OF THE DRAWINGS

FIGS. 3A to 3D are views for illustrating the operation to temporarily attach the fastener.

FIGS. 4A to 4C are views for illustrating the operation to attach an interior member to the fastener that is temporarily attached.

FIG. 7A is a front view of the fastener, and FIG. 7B is a side view of the fastener.

FIG. 8A is a top view of the fastener, and FIG. 8B is a cross-sectional view of the fastener taken along the line A-A of FIG. 7B.

FIGS. 10A to 10C are views for illustrating the operation to temporarily attach the fastener according to the fourth modification.

FIGS. 11A to 11C are views for illustrating the operation to attach an interior member to the fastener that is temporarily attached.

MODE FOR CARRYING OUT THE INVENTION

Figure 1A:
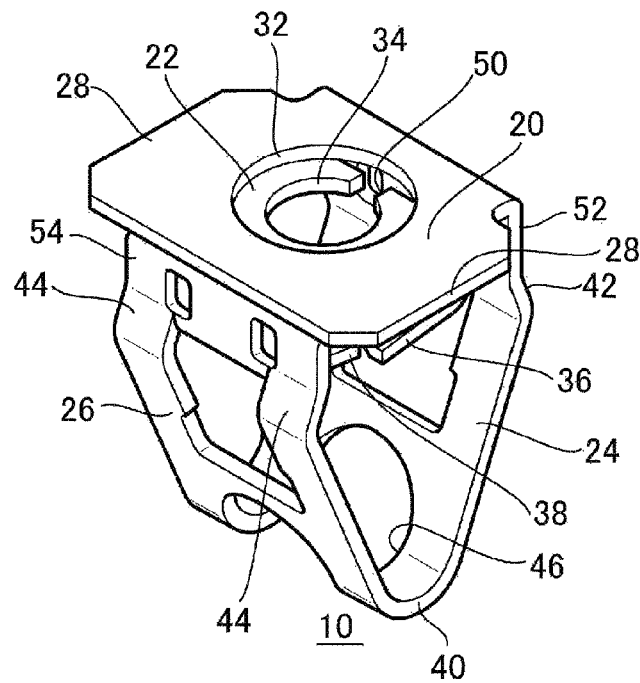
FIG. 1A is a perspective view of a fastener seen from the top side.
Figure 1B:
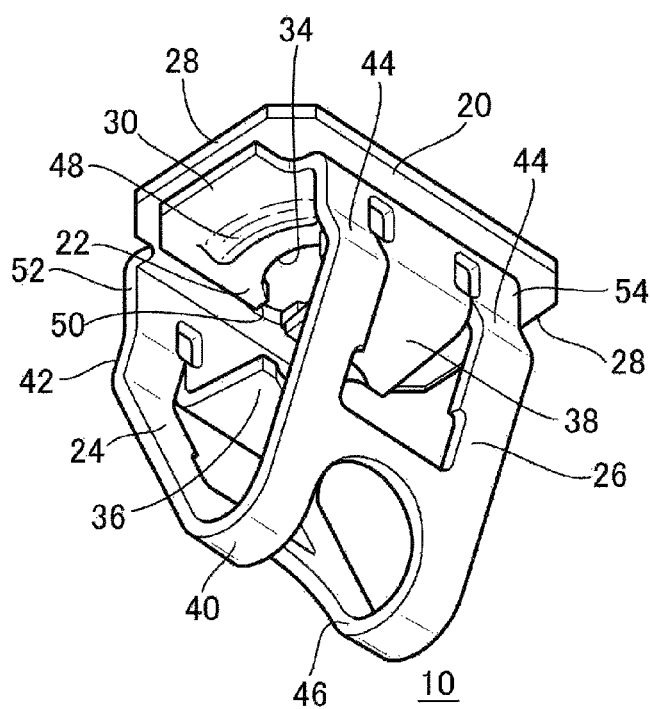
FIG. 1B is a perspective view of the fastener seen from the back side.

FIG. 1A is a perspective view of a fastener 10 viewed from the top side, and FIG. 1B is a perspective view of the fastener 10 viewed from the back side. The fastener 10 is fixed to a mounting hole provided to a vehicle body panel. A screw member that is arranged to hold a member to be attached is inserted and screwed into the fastener 10 temporarily attached to the mounting hole, whereby the member to be attached can be attached to the vehicle body panel. In other words, the fastener 10 is used to attach the member to be attached to the vehicle body panel. The member to be attached includes a trim member, a vehicle interior member, and the like. The interior member includes a dashboard and an instrument panel.

The fastener 10 has a quadrangular pyramid shape, and the mounting hole of the vehicle body panel has a rectangular shape. This configuration can regulate the rotation of the fastener 10.

The fastener 10 is made by cutting out a predetermined-shaped piece from one metallic plate, and then bending the piece by a press. Making the fastener 10 of one metallic plate can bring down the production cost. The fastener 10 includes a second head portion 22, a first leg portion 24, a second leg portion 26, a first flange portion 28, a second flange portion 30, an insertion hole portion 32, a screw hole portion 34, a first sandwiching portion 36, a second sandwiching portion 38, a connecting portion 40, a first engagement portion 42, a second engagement portion 44, a through-hole 46, protruding portions 48, and a slit 50.

Made of metallic material, the fastener 10 can have a fixing power greater than a fastener made of resin material, and is thus prevented from rattling when attached. Meanwhile, when the fastener 10 made of metallic material is temporarily attached to a mounting hole while leg portions of the fastener are bent to be inserted into the mounting hole, the leg portions are hard to be bent and inserted because they are made of metallic material. In order to solve this problem, the lengths of the first leg portion 24 and the second leg portion 26 (referred to simply as the "leg portions" when they are not distinguished from each other) are secured allowing the first leg portion 24 and the second leg portion 26 to be easily bent, which can improve the attaching operation of the fastener 10 when temporarily attached. In addition, a pressing surface arranged to be pressed in by a user with a finger is secured, which can facilitate the fastener 10 to be pressed into the mounting hole. A detailed description of the fastener 10 will be provided with reference to the following drawings.

Figure 2A:
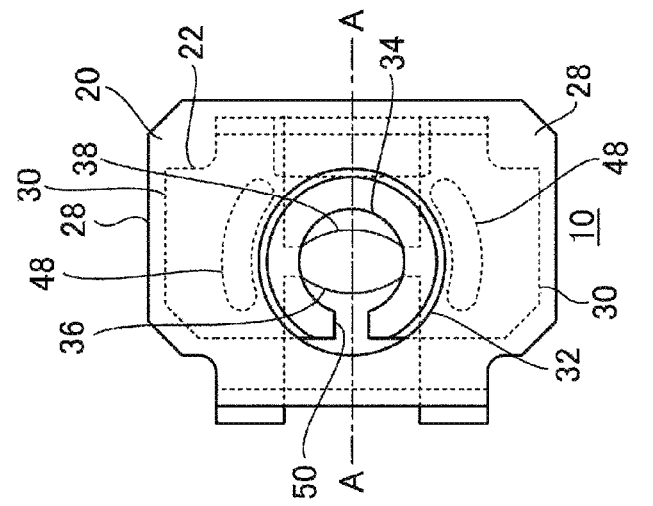
FIG. 2A is a side view of the fastener where leg portions are viewed from the side.
Figure 2B:
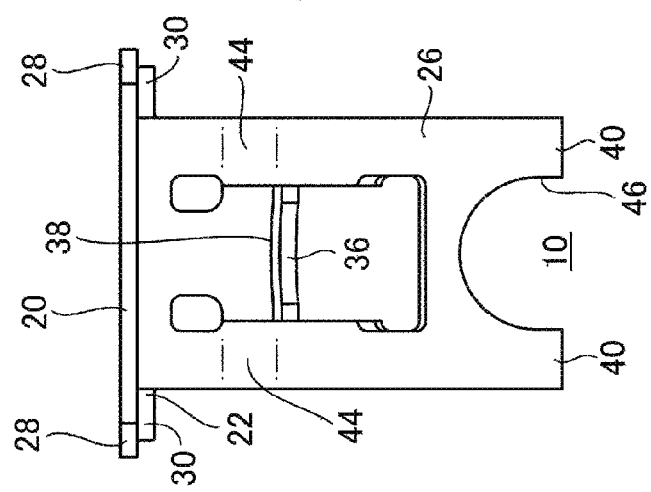
FIG. 2B is a side view of the fastener where the leg portions are viewed from the front.
Figure 2C:
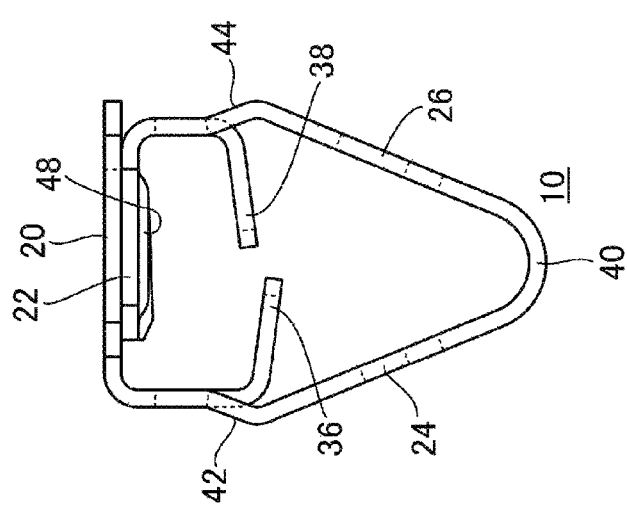
FIG. 2C is a surface view of the fastener.

FIG. 2A is a side view of the fastener 10 where leg portions are viewed from the side, FIG. 2B is a side view of the fastener 10 where the leg portions are viewed from the front, and FIG. 2C is a surface view of the fastener 10. In the present description, same or equivalent components and members shown in the drawings are provided with same reference numerals, and repeated descriptions of the same or equivalent components and members are omitted as appropriate.

As shown in FIG. 2A, the fastener 10 includes the connecting portion 40 disposed at the pyramid-shaped distal end, and the first leg portion 24 and the second leg portion 26 opposed to each other and extending from the connecting portion 40. The first leg portion 24 and the second leg portion 26 have elasticity, and can be bent having the connecting portion 40 as fulcrum point so as to approach with each other or open from each other. The connecting portion 40 connects the first leg portion 24 and the second leg portion 26.

As shown in FIG. 2A, the first leg portion 24 and the second leg portion 26 extend so as to open from the connecting portion 40 toward the first head portion 20 and the second head portion 22, and the first engagement portion 42 is disposed so as to be bent in the midstream of the first leg portion 24 while the second engagement portion 44 is disposed so as to be bent in the midstream of the second leg portion 26. The first leg portion 24 and the second leg portion 26 extend from the connecting portion 40 so as to get close toward the first head portion 20 and the second head portion 22 in the first engagement portion 42 and the second engagement portion 44 (referred to simply as the "engagement portions" when they are not distinguished from each other). The first engagement portion 42 and the second engagement portion 44 are engaged with the edge of the mounting hole of the vehicle body panel on the back side at the time of attachment. By having an inclined surface having a predetermined length in an axial direction, the first engagement portion 42 and the second engagement portion 44 can respond to change in thickness in the vehicle body panel. The axial direction defines a direction along the central axes of the insertion hole portion 32 and the screw hole portion 34.

The first leg portion 24 includes a first connecting portion 52 that connects the first engagement portion 42 and the first head portion 20 while the second leg portion 26 includes a second connecting portion 54 that connects the second engagement portion 44 and the second head portion 22. The first connecting portion 52 and the second connecting portion 54 are disposed parallel to each other and vertical to the head portions.

The first head portion 20 extends from the distal end of the first leg portion 24 toward the second leg portion 26. The second head portion 22 extends from the distal end of the second leg portion 26 toward the first leg portion 24. The distal ends of the first head portion 20 and the second head portion 22 are spaced apart from each other. The first head portion 20 and the second head portion 22 are referred to simply as the "head portions" when they are not distinguished from each other.

The first head portion 20 and the second head portion 22 are disposed so as to overlie with each other. Having the doubled head portions can increase the rigidity of the head portions. The state where the first head portion 20 and the second head portion 22 overlie with each other defines a state where the first head portion 20 and the second head portion 22 abut on or are adjacent to each other. The first head portion 20 is disposed on the top side of the second head portion 22 to protect the head portion 22.

As shown in FIG. 2B, the first head portion 20 includes the first flange portion 28 that extends outward from the first leg portion 24 in the width direction, and the second head portion 22 includes the second flange portion 30 that extends outward from the second leg portion 26 in the width direction. The first flange portion 28 and the second flange portion 30 are referred to simply as the "flange portions" when they are not distinguished from each other, and are arranged to be engaged with the edge of the mounting hole of the vehicle body panel on the top side at the time of attachment. The flange portions and the engagement portions are arranged to sandwich a hole edge of the mounting hole of the vehicle body panel.

As shown in FIG. 1A, the first head portion 20 includes the insertion hole portion 32, and the second head portion 22 includes the screw hole portion 34. A screw member is screwed into the screw hole portion 34. The insertion hole portion 32 is larger in diameter than the screw hole portion 34, and has a size such that a screw member cannot be screwed thereinto. As shown in FIG. 2C, the insertion hole portion 32 and the screw hole portion 34 are disposed almost coaxial with each other in the state of no external force acting thereon.

The second head portion 22 includes a slit 50 arranged to divide a hole edge that defines the screw hole portion 34 in the circumferential direction. This configuration makes the screw hole portion 34 easily deformable, whereby a screw member is made easy to be mounted thereto. In addition, since the screw hole portion 34 is deformable, a screw member 16 having a different thread pitch can be screwed into the screw hole portion 34. The connecting portion 40 includes the through-hole 46 through which the distal end of a screw member screwed into the screw hole portion 34 can pass. Since the head portions have a double structure, the first head portion 20 can be prevented from deforming in the axial direction of the second head portion 22 when a screw member is screwed into the second head portion 22 including the slit 50.

As shown in FIGS. 1B and 2C, the second head portion 22 includes the plural protruding portions 48 on the back surface, which protrude toward the connecting portion 40. The plural protruding portions 48 are disposed on both the sides of the reference line A-A passing through the center of the slit 50 and the screw hole portion 34 as shown in FIG. 2C. The protruding portions 48 are arc shaped along the outer periphery of the screw hole portion 34. The outer peripheries of the protruding portions 48 are adjacent to the second flange portion 30. When the fastener 10 is attached to the mounting hole of the vehicle body panel, the protruding portions 48 protrude into the mounting hole to be adjacent to the hole edge of the mounting hole. Thus, the configuration that the protruding portions 48 abut on the mounting hole of the vehicle body panel can limit excess deformation of the screw hole portion 34 including the slit 50 in the radial direction. In addition, the protruding portions 48 function as ribs to increase the rigidity of the second head portion 22. The rigidity of the second head portion 22 can be more increased by making the protruding portions 48 arc-shaped.

The first leg portion 24 includes the first sandwiching portion 36 extending toward the second leg portion 26. The second leg portion 26 includes the second sandwiching portion 38 extending toward the first leg portion 24. The first sandwiching portion 36 and the second sandwiching portion 38 have elasticity, and are expandingly opened from each other by abutting a screw member inserted into the screw hole portion 34, and be prevented from approaching with each other by abutting on the screw member. As shown in FIG. 2C, the space between the distal ends of the first sandwiching portion 36 and the second sandwiching portion 38 intersect the central axes of the insertion hole portion 32 and the screw hole portion 34. This configuration prevents the distal end of the screw member from being caught by the first sandwiching portion 36 and the second sandwiching portion 38 when the screw member is inserted.

The first sandwiching portion 36 and the second sandwiching portion 38 have the shape of the letter L in side view. The first sandwiching portion 36 and the second sandwiching portion 38 (referred to simply as "sandwiching portions" when they are not distinguished from each other) extend from the midstreams of the leg portions or from the end portions of the head portions. The root portions of the sandwiching portions are disposed closer to the head portions than the first engagement portion 42 and the second engagement portion 44, and are along the first connecting portion 52 and the second connecting portion 54. The distal end portions of the sandwiching portions are bent from the root portions to extend inward. Since the root portions of the sandwiching portions are along the first connecting portion 52 and the second connecting portion 54, the sandwiching portions do not extend outside of the leg portions.

FIGS. 3A to 3D are views for illustrating the operation to temporarily attach the fastener 10. The inner periphery of the mounting hole 12a of the vehicle body panel 12 is rectangular. The fastener 10 is temporarily attached by being pressed into the mounting hole 12a, the process of which is shown in FIGS. 3A to 3D. As shown in FIG. 3A, the fastener 10 is first inserted from the connecting portion 40 into the mounting hole 12a. The fastener 10 tapers down to the connecting portion 40, whereby the insertion can be facilitated.

As shown in FIG. 3B, a user presses the first head portion 20 of the fastener 10 with his/her finger. The first head portion 20 includes a pressing surface that can be pressed in by a user on its front surface. As shown in FIG. 1A, the surface of the first head portion 20 is flat except that the insertion hole portion 32 is provided in its center, and there is no convex portion on the front surface. Thus, the first head portion 20 has a shape such that a user can easily press in. The pressing surface is a smooth flat surface or a smooth curved surface. In addition, since the fastener 10 has a configuration that the first head portion 20 closes up the space between the distal ends of the first leg portion 24 and the second leg portion 26, a user can easily push in the fastener 10 only by pressing the pressing surface straight toward the mounting hole 12a in comparison with a configuration that the first head portion 20 does not close up the space between the distal ends of the first leg portion 24 and the second leg portion 26. In addition, since the first head portion 20 is larger than the second head portion 22, and the second head portion 22 stays within the back side of the first head portion 20 so as not to lie off the first head portion 20 even when the first leg portion 24 and the second leg portion 26 approach with each other, the second head portion 22 can be prevented from jutting out to hurt the user's finger when the first head portion 20 is pressed in with the finger.

As shown in FIG. 3B, the first leg portion 24 and the second leg portion 26 abut on the inner periphery of the mounting hole 12a to be bent so as to approach with each other. Since the largest opposed space between the first leg portion 24 and the second leg portion 26 is larger than the hole width of the mounting hole 12a, the first leg portion 24 and the second leg portion 26 are bent to pass so as to approach with each other when inserted into the mounting hole 12a. When the first leg portion 24 and the second leg portion 26 approach with each other, the first head portion 20 and the second head portion 22 relatively move. The fulcrum points of the first leg portion 24 and the second leg portion 26 are the connecting portion 40, and the points of load are the portions abutting on the mounting hole 12a. While the first engagement portion 42 and the second engagement portion 44 are limited to be disposed close to the head portions, the connecting portion 40 is not limited in terms of its location. Thus, the first leg portion 24 and the second leg portion 26 can be designed so as to be easily bent by disposing the fulcrum points far from the points of load. Thus, the insertion force at the time of temporarily attaching is reduced to facilitate the temporarily attaching work.

Further, the pressing surface of the first head portion 20 is pressed in with a finger, and the portions of the first leg portion 24 and the second leg portion 26 that have the largest opposed space abuts on the inner periphery of the mounting hole 12a as shown in FIG. 3C. The state where the first leg portion 24 and the second leg portion 26 are bent so as to fully approach with each other is shown in FIG. 3C. Even in the state where the first leg portion 24 and the second leg portion 26 are bent so as to fully approach with each other, the second head portion 22 stays within the first head portion 20 so as not to lie off the first head portion 20. The engagement portions are disposed closer to the head portions than the portions of the leg portions that have the largest opposed space.

As shown in FIG. 3D, the fastener 10 is temporarily attached in a state where the first engagement portion 42 and the second engagement portion 44 pass through the mounting hole 12a, and the first connecting portion 52 and the second connecting portion 54 abut on the inner periphery of the mounting hole 12a. The first flange portion 28 and the second flange portion 30 and the first engagement portion 42 and the second engagement portion 44 temporarily retain the fastener 10 not to fall from the mounting hole 12a, whereby the fastener 10 is temporarily attached. Since the sandwiching portions do not extend outside of the leg portions in the opposed direction, this configuration does not become a burden of the temporarily attaching work at the time of temporarily attaching. Thus, the temporarily attaching work can be facilitated.

FIGS. 4A to 4C are views for illustrating the operation to temporarily attach an interior member 14 to the fastener 10 that is temporarily attached. FIG. 4A shows a state where a mounting hole 14a of the interior member 14 is aligned with the screw hole portion 34 of the fastener 10 that is temporarily attached. To be specific, the mounting hole 14a, the insertion hole portion 32, and the screw hole portion 34 are concentrically disposed.

The screw member 16 is inserted into the mounting hole 14a, the insertion hole portion 32, and the screw hole portion 34 as shown in FIG. 4B. The screw member 16 includes a screw head portion 16a and a screw shaft portion 16b. The screw shaft portion 16b of the screw member 16 is screwed into the screw hole portion 34.

When the screw member 16 is screwed into the screw hole portion 34, the distal ends of the first sandwiching portion 36 and the second sandwiching portion 38 abut on the outer peripheral surface of the screw shaft portion 16b. This is because the first sandwiching portion 36 and the second sandwiching portion 38 extend into the screw hole portion 34 as viewed in the central axis of the screw hole portion 34 as shown in FIG. 2C. The first sandwiching portion 36 and the second sandwiching portion 38 are expandingly opened by abutting the screw shaft portion 16b.

As shown in FIG. 4C, the opened first sandwiching portion 36 and second sandwiching portion 38 are engaged with the hole edge of the mounting hole 12a on the back side. The first sandwiching portion 36 and the second sandwiching portion 38 function as an engagement portion to be engaged with the hole edge of the mounting hole 12a on the back side by the insertion of the screw member. In the fastener 10, the first leg portion 24 and the second leg portion 26 also receive a force in the opening direction by the opening of the first sandwiching portion 36 and the second sandwiching portion 38, so that the first engagement portion 42 and the second engagement portion 44 are secondarily engaged with the hole edge of the mounting hole 12a.

It is to be noted that to be engaged with the hole edge of the mounting hole 12a defines the state of abutting on the hole edge of the mounting hole 12a, and to be engageable with the hole edge of the mounting hole 12a defines both of the state of abutting and the state of not abutting on the hole edge of the mounting hole 12a. The first engagement portion 42 and the second engagement portion 44 may be or may not be engaged with the hole edge of the mounting hole 12a such as to be associated with the opening of the first sandwiching portion 36 and the second sandwiching portion 38. When the fastener 10 is temporarily attached, the first leg portion 24 and the second leg portion 26 can be bent to be temporarily attached without the action by the first sandwiching portion 36 and the second sandwiching portion 38, so that the press force required for attaching work can be reduced.

The screw head portion 16a presses the interior member 14 against the vehicle body panel 12, and the vehicle body panel 12 and the interior member 14 are sandwiched between the screw head portion 16a and the first sandwiching portion 36 and the second sandwiching portion 38. The interior member 14 is thus attached to the vehicle body panel 12. The distal end of the screw shaft portion 16b is inserted into the through-hole 46 of the connecting portion 40, and the shaft deflection of the screw member 16 can be prevented by the through-hole 46.

The screw shaft portion 16b is arranged to prevent the first sandwiching portion 36 and the second sandwiching portion 38 from approaching with each other, so that the engagement of the first sandwiching portion 36 and the second sandwiching portion 38 is not easily broken. The sandwiching portions are inclined toward the connecting portion 40 to urge the screw member 16 toward the head portion. Thus, when the screw member 16 is removed, the sandwiching portions can apply an urging force in a releasing direction of the screw member 16.

Figure 5A:
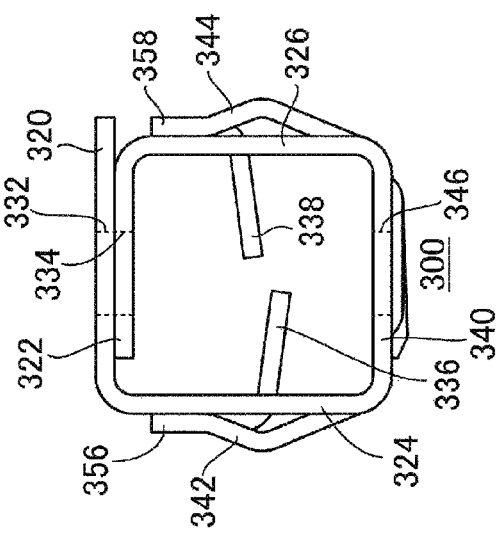
FIGS. 5A to 5C are views for illustrating fasteners according to modifications.
Figure 5B:
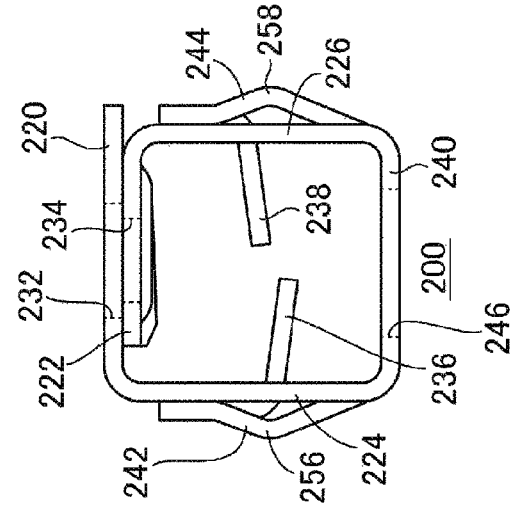
Figure 5C:
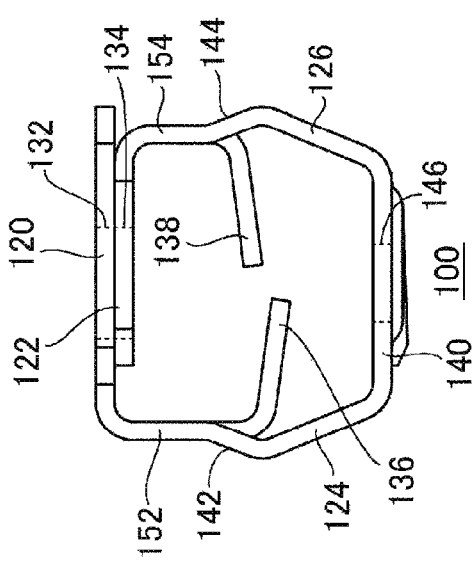

FIGS. 5A to 5C are views for illustrating fasteners according to modifications. FIG. 5A is a side view of a fastener 100 according to the first modification, FIG. 5B is a side view of a fastener 200 according to the second modification, and FIG. 5C is a side view of a fastener 300 according to the third modification. The fasteners according to these modifications are rectangular in a side view, and different in terms of the shape of the connecting portions from the pyramid-shaped fastener 10 shown in FIGS. 1A and 1B. To be specific, the connecting portions are opposed to the head portions and have a flat plate shape.

The fastener 100 shown in FIG. 5A includes a first head portion 120, a second head portion 122, a first leg portion 124, a second leg portion 126, a first sandwiching portion 136, a second sandwiching portion 138, a connecting portion 140, a first engagement portion 142, a second engagement portion 144, a first connecting portion 152, and a second connecting portion 154. The configuration of the fastener 100 is almost the same as the configuration of the fastener 10 shown in FIGS. 1A and 1B except the shapes of the connecting portion 140 and the second head portion 122 while being different in terms of the position of the screw hole portion into which the screw member 16 is screwed.

In the fastener 100 according to the first modification, a screw hole portion 146 is provided to the connecting portion 140, an insertion hole portion 134 is provided to the second head portion 122, and the screw hole portion 146 into which the screw member 16 is screwed is disposed at the bottom of the fastener 100. The insertion hole portion 132 and the insertion hole portion 134 of the first head portion 120 and the second head portion 122 are larger in diameter than the screw shaft portion 16*b*.

Also in the fastener 100 according to the first modification, the front surface of the first head portion 120 functions as a pressing surface, so that a user can easily press in the fastener 100 with his/her finger.

The fastener 200 shown in FIG. 5B includes a first head portion 220, a second head portion 222, a first supporting portion 224, a second supporting portion 226, an insertion hole portion 232, a screw hole portion 234, a first sandwiching portion 236, a second sandwiching portion 238, a connecting portion 240, a first engagement portion 242, a second engagement portion 244, a through-hole 246, a first leg portion 256, and a second leg portion 258. The fastener 200 is different from the fastener 10 shown in FIGS. 1A and 1B in that the head portions, not the leg portions, are connected with the first supporting portion 224 or the second supporting portion 226. The first supporting portion 224 extends from the connecting portion 240 and supports the first head portion 220. The second supporting portion 226 extends from the connecting portion 240 and supports the second head portion 222.

The first leg portion 256 and the second leg portion 258 extend toward the head portions while having the connecting portion 240 as the base end, and includes free ends. The bent first engagement portion 242 and the bent second engagement portion 244 are disposed in the midstreams of the first leg portion 256 and the second leg portion 258. In addition, the first sandwiching portion 236 and the second sandwiching portion 238 extend from the vicinities of the free ends of the first leg portion 256 and the second leg portion 258. The connecting portion 240 is disposed at one ends of the first leg portion 256 and the second leg portion 258, and the first head portion 220 and the second head portion 222 are disposed at the other ends of the first leg portion 256 and the second leg portion 258. The embodiment that the head portions are disposed on the other sides of the leg portions includes the embodiment that the head portions are not connected with the leg portions, that is, the embodiment that the head portions supported by the supporting portions are disposed on the other sides of the leg portions as shown in FIG. 5B. In addition, the embodiment that the head portions are disposed on the other sides of the leg portions includes the embodiment that the head portions are connected with end portions of the leg portions as shown in FIG. 5A.

The first sandwiching portion 236 and the second sandwiching portion 238 have the shape of the letter L in side view. When the screw member 16 is inserted into the screw hole portion 234, the first sandwiching portion 236 and the second sandwiching portion 238 abut on the outer peripheral surface of the screw shaft portion 16*b* to be opened together with the first leg portion 256 and the second leg portion 258. Thus, the first engagement portion 242 and the second engagement portion 244 can be engaged with the edge of the mounting hole 12*a* of the vehicle body panel 12 on the back side. In the fastener 200 according to the second modification, the first engagement portion 242 and the second engagement portion 244 function as engagement portions for temporary attachment and engagement portions to be engaged with the mounting hole 12*a* when the screw member is screwed into the fastener 200. Thus, the first supporting portion 224 and the second supporting portion 226 are configured not to be bent, whereby the insertion hole portion 232 and the screw hole portion 234 of the first head portion 220 and the second head portion 222 can be prevented from being out of alignment. In addition, the fastener 200 can be easily pressed in by pressing the pressing surface of the head portion 220. When the first supporting portion 224 and the second supporting portion 226 are not distinguished from each other, they are referred to simply as the supporting portions.

The fastener 300 shown in FIG. 5C includes a first head portion 320, a second head portion 322, a first supporting portion 324, a second supporting portion 326, an insertion hole portion 332, a first sandwiching portion 336, a second sandwiching portion 338, a connecting portion 340, a first engagement portion 342, a second engagement portion 344, a screw hole portion 346, a first leg portion 356, and a second leg portion 358. The fastener 300 is different from the fastener 200 shown in FIG. 5B in that the screw hole portion is disposed at the connecting portion while being the same in terms of the configuration other than the position of the screw hole portion.

In the fastener 300, the insertion hole portion 332 and an insertion hole portion 334 that are not threadable with the screw member 16 are provided to the first head portion 320 and the second head portion 322, and the screw hole portion 346 threadable with the screw member 16 is provided to the connecting portion 340.

Figure 6:
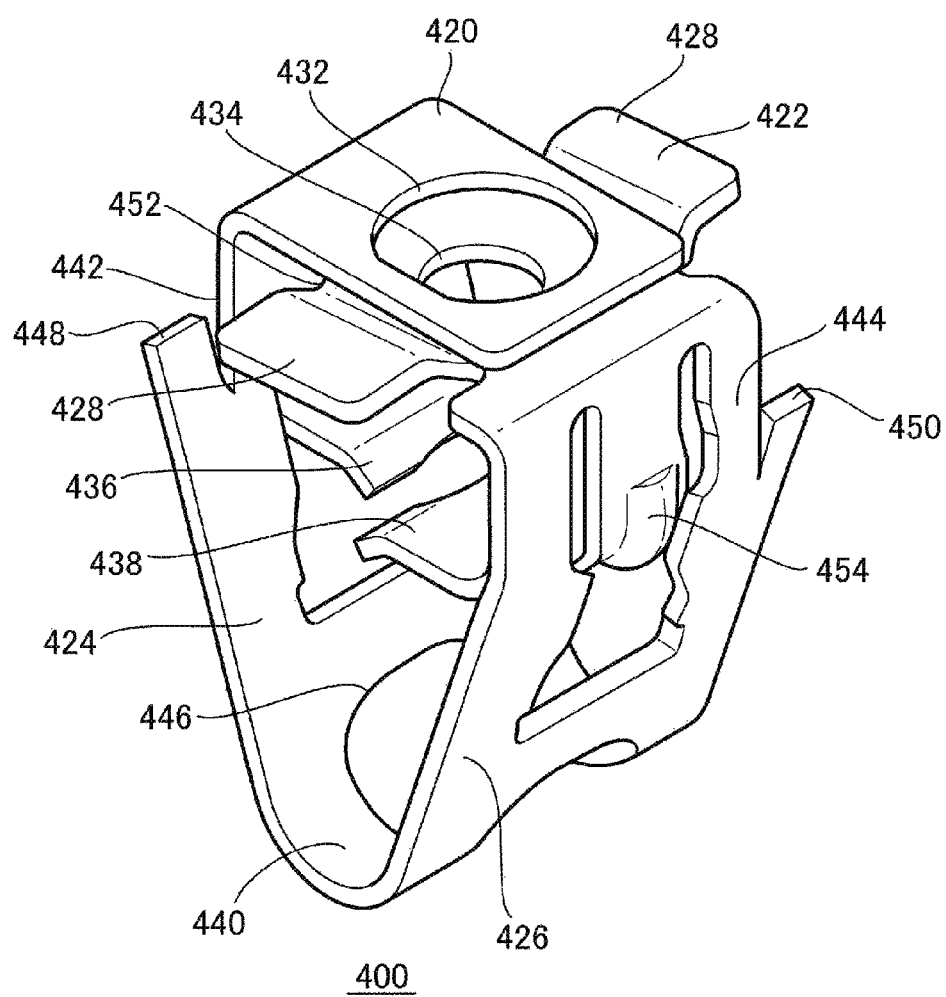
FIG. 6 is a perspective view of a fastener according to the fourth modification.

FIG. 6 is a perspective view of a fastener 400 according to the fourth modification. The fastener 400 includes a first head portion 420, a second head portion 422, a first leg portion 424, a second leg portion 426, flange portions 428, an insertion hole portion 432, a screw hole portion 434, a first sandwiching portion 436, a second sandwiching portion 438, a connecting portion 440, a first engagement portion 442, a second engagement portion 444, a through-hole 446, a first limiting portion 448, and a second limiting portion 450.

The first leg portion 424 and the second leg portion 426 (referred to simply as the "leg portions" when they are not distinguished from each other) are opposed to each other and connected with the connecting portion 440 at one ends while being connected with the first head portion 420 and the second head portion 422 (referred to simply as the "head portions" when they are not distinguished from each other) at the other ends. The first head portion 420 and the second head portion 422 are opposed to the connecting portion 440.

The fastener 400 according to the fourth modification is different in terms of the shape of the head portions from the fastener 10 according to the embodiment shown in FIGS. 1A and 1B. Also in the fastener 400 according to the fourth modification, the distance between the connecting portion and the head portions are sufficiently secured, whereby the lengths of the leg portions are secured allowing the leg portions to be easily bent in a similar manner to the fastener 10 shown in FIGS. 1*a* and 1B. A detailed description of each constituent element of the fastener 400 will be provided with reference to other drawings.

FIG. 7A is a front view of the fastener 400, and FIG. 7B is a side view of the fastener 400. FIG. 8A is a top view of the fastener 400, and FIG. 8B is a cross-sectional view of the fastener 400 taken along the line A-A of FIG. 7B. In FIG. 8B, the vehicle body panel 12 in addition to the fastener 400 are shown.

Bead portions 454 that are made by being recessed along the extending directions are partially provided to the first sandwiching portion 436 and the second sandwiching portion 438. The bead portions 454 can increase the rigidity of the first sandwiching portion 436 and the second sandwiching portion 438 so as not to be bent easily, whereby the engagement force of the first sandwiching portion 436 and the second sandwiching portion 438 can be increased. In addition, by relatively making the root portions of the first sandwiching portion 436 and the second sandwiching portion 438 bendable easily where no bead portions 454 are provided, the root portions can be made to easily extend outward by the insertion of a screw member.

The first limiting portion 448 protruding outward in the opposed direction is disposed on one side edge of the first leg portion 424, and the second limiting portion 450 protruding outward in the opposed direction is disposed on one side edge of the second leg portion 426. Only one pair of the first limiting portion 448 and the second limiting portion 450 (referred to as the "limiting portions" when they are not distinguished from each other) are disposed at the opposing corner shown in FIG. 8A. When inserted into a mounting hole, the limiting portions extend out on the back side of the mounting hole to function as retainers. Only by providing one pair of limiting portions at the opposing corner, the fastener 400 can be twisted with respect to the mounting hole to be pulled out when the fastener 400 is inserted wrongly into a rectangular mounting hole while the long side is confused with the short side, whereby the fastener 400 can be easily removed from the mounting hole.

The first head portion 420 overlies the second head portion 422 on the top side, and includes a pressing surface that can be pressed in by a user on its front surface. The first head portion 420 includes the insertion hole portion 432, into which a screw member is inserted, in the center of the flat plate. The insertion hole portion 432 is larger in diameter than the screw member.

The second head portion 422 includes a pair of flange portions 428 arranged to be engaged with the edge of the rectangular mounting hole on the top side, a concave portion 452 more recessed toward the connecting portion 440 than the flange portions 428, and a screw hole portion 434 into which the screw member is screwed. The concave portion 452 is connected with inclined surfaces 429 that are inclined from the flange portions 428. The screw hole portion 434 does not include a slit 50, which is not like the screw hole portion 34 of the fastener 10 shown in FIG. 1A, and is connected in the whole periphery. Thus, the fastener 400 can be fastened firmly when the screw member is screwed into the screw hole portion 434.

As shown in FIG. 8B, the second head portion 422 includes the concave portion 452 between the pair of flange portions 428, and the first head portion 420 overlies the concave portion 452 while not overlying the inclined surfaces 429 of the second head portion 422. As shown in FIG. 8A, the first head portion 420 is disposed so as to stay within the concave portion 452 while being disposed to overlie the concave portion 452 thereabove as viewed in a direction perpendicular to the plane of the first head portion 420. In the separating direction of the pair of flange portions 428, the width of the first head portion 420 is shorter than the space between the pair of flange portions 428. Thus, the first head portion 420 can be made to stay within the concave portion 452 in the attached state.

In addition, the concave portion 452 is formed depending on the size of the mounting hole 12a so as to stay within the mounting hole 12a, and the width of the concave portion 452 is shorter than the long side of the mounting hole 12a. The concave portion 452 is disposed inside of the mounting hole 12a as viewed in the direction of attaching the fastener 400. Thus, the concave portion 452 can be made to stay within the mounting hole 12a as viewed in the direction of attaching the fastener 400. The direction of attaching the fastener 400 defines a direction in which the fastener 400 is inserted into the mounting hole 12a, and a direction perpendicular to the plane of the opening of the mounting hole 12a.

In a normal state shown in FIGS. 6 and 7B, the side of a distal end 422a of the second head portion 422 is inclined so as to be apart from the first head portion 420. The normal state defines a state where the fastener 400 is not attached. Thus, when the molded fastener 400 is soaked in a rust preventive liquid to be surface treated, the opposed surfaces of the first head portion 420 and the second head portion 422 can be more easily surface treated compared with the case where the first head portion 420 is in surface contact with the second head portion 422, which can increase the corrosion resistance.

The root side of the second head portion 422 abuts on a distal end 420a of the first head portion 420 in the normal state. This configuration can prevent, during transportation of fasteners 400, a plate surface of one fastener 400 from getting into the space between a first head portion 420 and a second head portion 422 of another fastener 400 and thus prevent the fasteners 400 from getting entangled.

Figure 9B:
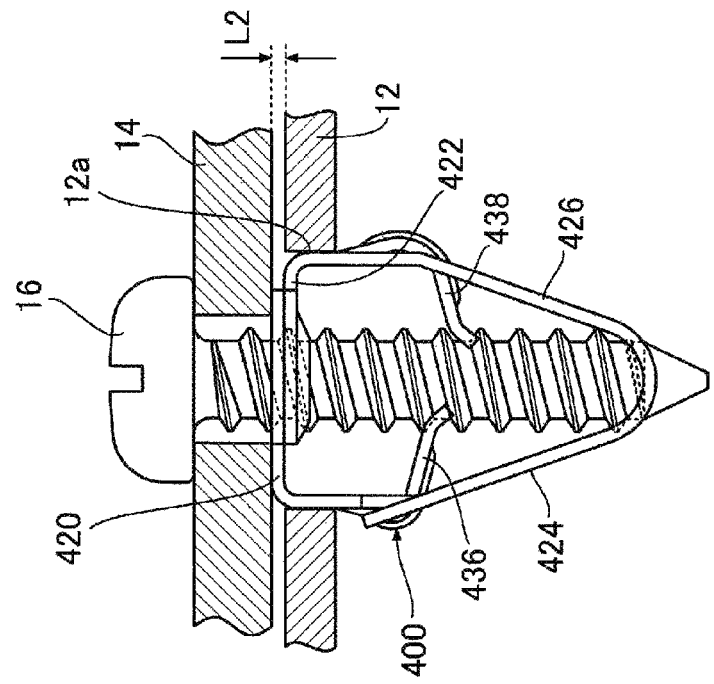
FIG. 9B is a view of the fastener according to the fourth modification showing its attached state.
Figure 9A:
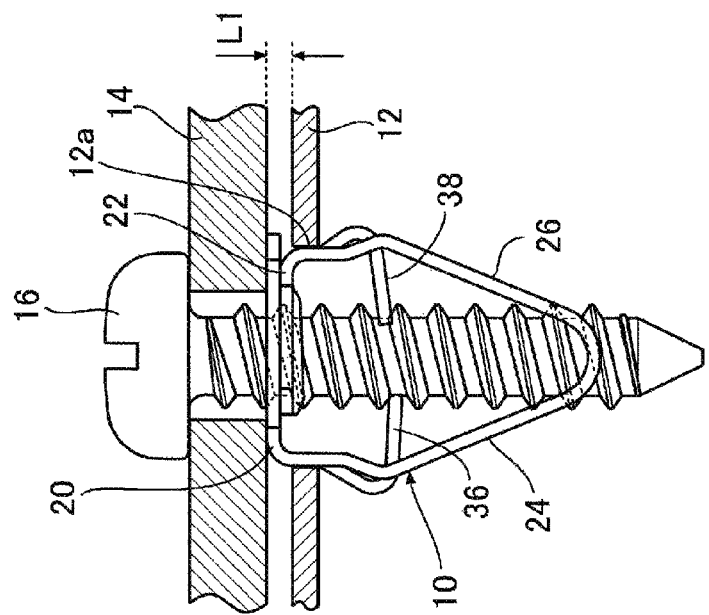
FIG. 9A is a view of the fastener shown in FIGS. 1A and 1B showing its attached state.

FIG. 9A is a view of the fastener 10 shown in FIGS. 1A and 1B showing its attached state, and FIG. 9B is a view of the fastener 400 according to the fourth modification showing its attached state. In FIGS. 9A and 9B, the fasteners in the attached states are compared with each other, and a description of the fastener 400 according to the fourth modification will be provided.

The fastener 10 shown in FIG. 9A is in a state where the flange portion of the second head portion 22 is engaged with the edge of the mounting hole 12a on the top side, and the first head portion 20 overlies the flange portion of the second head portion 22. Thus, the space L1 between the vehicle body panel 12 and the interior member 14 equals to the thickness of two sheets of the first head portion 20 and the second head portion 22.

In the fastener 400, the flange portions 428 are engaged with the edge of the mounting hole when the fastener 400 is attached, and the concave portion 452 is disposed inside the mounting hole. The concave portion 452 is more recessed than the flange portions 428 by the thickness of one sheet of the concave portion 400. When the screw member is screwed into the fastener 400, the flange portions 428 of the second head portion 422 and the first head portion 420 are placed on the same plane. It is to be noted that the concave portion 452 may be recessed than the flange portions 428 by the thickness of one sheet or more.

In the attached state shown in FIG. 9B, since the first head portion 420 stays within the concave portion 452, and the first head portion 420 and the flange portions 428 of the second head portion 422 are placed on the same plane, the head portions protruding from the surface of the vehicle body panel 12 can be thinned. The space L2 between the vehicle body panel 12 and the interior member 14 equals to the thickness of one sheet of the flange portions 428. The first head portion 420 overlies to be in surface contact with the second head portion 422 in the attached state, which can prevent the vehicle body panel 12 and the interior member 14 from rattling.

The first member to which the fastener 400 is attached is not limited to the vehicle body panel 12 made from metal, and a panel made from resin can be also used. In this case, the flange portions 428 could be counterbored so as to dent by being pressed by the resin panel when the fastener 400 is fastened by the screw member 16, or a surface of the resin panel could be counterbored in advance by the thickness of the flange portions 428. In the fastener 400, since the resin panel is counterbored by the thickness of one sheet of the flange portions 428, the resin panel can be prevented from being deformed, so that the fastener 400 can be used also for a thin resin panel.

FIGS. 10A to 10C are views for illustrating the operation to temporarily attach the fastener 400 according to the fourth modification. In FIGS. 10A to 10C, the rectangular mounting hole 12a indicates a cross section along the long sides, and the pair of leg portions are disposed on the short sides and opposed to each other in the long side direction.

Shown in FIG. 10A is a side view of the fastener 400 yet to be inserted into the mounting hole 12a of the vehicle body panel 12. The pressing surface 420b of the first head portion 420 is pressed in and the fastener 400 is inserted from the connecting portion 440 into the mounting hole 12a. Then, as shown in FIG. 10B, the first leg portion 424 and the second leg portion 426 abut on the edge of the mounting hole 12a.

In the fastener 400 being passing through the mounting hole 12a as shown in FIG. 10C, the first leg portion 424 and the second leg portion 426 approach with each other, and the distal end 422a of the second head portion 422 approaches the first leg portion 424. At this time, since the distal end side of the second head portion 422 is inclined so as to be apart from the first head portion 420, the back surface of the first head portion 420 and the front surface of the second head portion 422 can be prevented from sliding, which can further facilitate the insertion.

As shown in FIG. 10C, the distal end 422a of the second head portion 422 does not abut on the first leg portion 424 if the fastener 400 is inserted in the rectangular mounting hole 12a properly; however, if the fastener 400 is wrongly inserted on the short sides, the first leg portion 424 and the second leg portion 426 are bent to further approach with each other than a case where the fastener 400 is inserted on the long sides. For this reason, the fastener 400 is configured not to be easily inserted in a wrong manner by having the distal end 422a abut on the first leg portion 424 while the fastener 400 is being inserted. As described above, a user presses in to temporarily attach the fastener 400 to the mounting hole 12a.

FIGS. 11A and 11C are views for illustrating the operation to temporarily attach the interior member to the fastener 400 that is temporarily attached. FIG. 11A shows the fastener 400 that is temporarily attached. The fastener 400 that is temporarily attached is made not to be easily fallen out by the first limiting portion 448 and the second limiting portion 450. Thus, a user can attach the interior member 14 with his/her both hands free from the fastener 400.

In FIG. 11B, the screw member 16 is inserted into the fastener 400 that is temporarily attached. The insertion of the screw member is difficult when the axes of the plural holes are out of alignment; however, when the screw member 16 is inserted into the screw hole portion 434, the second head portion 422 can be prevented from being deformed toward the connecting portion 440 by the contact with the screw member 16 since the flange portions 428 of the second head portion 422 are engaged with the mounting hole 12a, whereby the insertion can be facilitated. As shown in FIG. 11C, the screw member 16 expandingly open the first sandwiching portion 436 and the second sandwiching portion 438 by abutting thereto. The first sandwiching portion 436 and the second sandwiching portion 438 are bent at the root sides where no bead portions 454 are provided, and engaged with the edge of the mounting hole 12a on the back side.

The second head portion 422 is pulled toward the first head portion 420 by being screwed by the screw member 16, and abuts on the first head portion 420, whereby attachment of the interior member 14 is completed. When a load is put on the interior member 14 in a direction away from the vehicle body panel 12, the first head portion 420 and the second head portion 422 can be prevented from being separated from each other since the screw member 16 is screwed into the screw hole portion 434 of the second head portion 422. As described above, providing the flange portions 428 and the screw hole portion 434 to the second head portion 422 can suppress deviation between the first head portion 420 and the second head portion 422 to facilitate the insertion of the screw member 16, which can prevent the first head portion 420 and the second head portion 422 from being separated from each other after completion of the attachment.

The present invention is not limited to the embodiments described above, and it is also possible to add modifications such as various kinds of design changes to the embodiments based on the knowledge of those skilled in the art. Embodiments to which such modifications are added can also be included within the scope of the present invention.

While the first leg portion 24 and the second leg portion 26 respectively include the first head portion 20 and the second head portion 22 in the embodiment, the present invention is not limited to this embodiment. For example, either one of the first leg portion 24 and the second leg portion 26 may include a head portion that includes a screw hole portion and a pressing surface. In addition, a first head portion and a second head portion extending from the first leg portion 24 and the second leg portion 26 may form a single head portion. To be specific, while the first head portion and the second head portion extend so as to approach with each other, one of them does not overlie the other, and each of them forms a semi circle of the insertion hole portion. In such an embodiment, a screw hole portion into which a screw member is screwed is provided to a connecting portion.

While the member to be attached is attached sandwiched between the screw head and the head portions of the fastener 10 in the embodiment, the present invention is not limited to this embodiment. For example, the member to be attached may be fixed to the screw head.

While the insertion hole portion 32 is provided to the first head portion 20 and the screw hole portion 34 is provided to the second head portion 22 in the embodiment, the present invention is not limited to this embodiment. For example, the first head portion 20 may include the screw hole portion 34, and the second head portion 22 may include the insertion hole portion 32. Further in another embodiment, the through-hole 46 of the connecting portion 40 may function as a screw hole portion into which the screw member 16 is screwed. In this embodiment, the screw member 16 is screwed at two upper and lower positions, which can prevent the shaft deflection of the screw member 16.

While the first sandwiching portion 36 and the second sandwiching portion 38 are expandingly opened from each other, and are prevented from approaching with each other by abutting the screw member inserted into the screw hole portion 34 in the embodiment, the present invention is not limited to this embodiment. For example, in another embodiment, a pair of sandwiching portions may have either one of the function of being opened from each other by abutting on the screw member and the function of being prevented from approaching with each other by abutting on the screw member.

While one pair of protruding portions 48 are provided in the second head portion 22, the number of the protruding portions 48 is not limited to one pair. For example, plural point-like protruding portions may be provided along the outer periphery of the screw hole portion 34. Also in such an embodiment, the plural protruding portions are disposed on both the sides of the reference line A-A.

While the first leg portion 256 and the second leg portion 258 are provided in the second modification, the present invention is not limited to this embodiment. These leg portions may extend in four directions of the connecting portion 240 so as to include four leg portions. To be specific, two pairs of leg portion opposed to each other are provided.

While the first supporting portion and the second supporting portion respectively include the first head portion and the second head portion in the embodiment shown in FIGS. 5B and 5C, the present invention is not limited to this embodiment. For example, one supporting portion may include a head portion while no supporting portion or no head portion other than the one supporting portion may be provided. In other words, a grommet may include a single head portion.

While the first leg portion 24 and the second leg portion 26 are opened by the screw member to be engaged with the edge of the mounting hole 12a on the back side in the embodiment, the present invention is not limited to this embodiment. For example, the first leg portion 24 and the second leg portion 26 may respectively include the first engagement portion 42 and the second engagement portion 44 engageable with the mounting hole 12a. The space between the first engagement portion 42 of the first leg portion 24 and the second engagement portion 44 of the second leg portion 26 is larger than the width of the mounting hole 12a. The first engagement portion 42 and the second engagement portion 44 approach with each other when inserted into the mounting hole 12a, and open after passing through the mounting hole 12a to be engaged with the edge of the mounting hole 12a on the back side. Thus, the fastener 10 can be engaged by the elastic force of the first leg portion 24 and the second leg portion 26.

While the flange portion 428 and the screw hole portion 434 are provided to the second head portion 422 in the fourth modification, the present invention is not limited to this embodiment. For example, a flange portion may be provided to the first head portion 420, and a screw hole portion into which the screw member 16 is screwed may be provided to the first head portion 420.

DESCRIPTION OF REFERENCE NUMERALS AND SIGNS

10 Fastener,
12 Vehicle body panel,
12a Mounting hole,
14 Interior member,
14a Mounting hole,
16 Screw member,
16a Screw head portion,
16b Screw shaft portion,
20 First head portion,
22 Second head portion,
24 First leg portion,
26 Second leg portion,
28 First flange portion,
30 Second flange portion,
32 Insertion hole portion,
34 Screw hole portion,
36 First sandwiching portion,
38 Second sandwiching portion,
40 Connecting portion,
42 First engagement portion,
44 Second engagement portion,
46 Through-hole,
48 Protruding portion,
50 Slit,
52 First connecting portion, and
54 Second connecting portion.

INDUSTRIAL APPLICABILITY

The present invention relates to a fastener capable of assembling predetermined members using a screw member.

The invention claimed is:

1. A fastener that is attached to a mounting hole of a first member and to which a second member is attached using a screw member, the fastener comprising:
a first leg portion having elasticity;
a second leg portion having elasticity, and being provided to be opposed to the first leg portion;
a connecting portion connecting one end of the first leg portion and one end of the second leg portion;
a head portion comprising:
a flange to be engaged with an edge of the mounting hole on a top side thereof; and
a pressing surface to be pressed by a user, the head portion being disposed on other ends of the first leg portion and the second leg portion so as to be opposed to the connecting portion; and
a screw hole portion into which the screw member is screwed, the screw hole portion being disposed in at least one of the connecting portion and the head portion,
wherein the first leg portion comprises a first engagement portion engageable with an edge of the mounting hole on a back side thereof,
wherein the second leg portion comprises a second engagement portion engageable with the edge of the mounting hole on the back side thereof,
wherein the head portion comprises:
a first head portion extending from the first leg portion; and
a second head portion extending from the second leg portion so as to overlie the first head portion,
wherein, when the first leg portion and the second leg portion approach with each other, the first head portion and the second head portion relatively move in a state where the first head portion and the second head portion overlie with each other,
wherein the first leg portion comprises a first sandwiching portion extending toward the second leg portion,
wherein the second leg portion comprises a second sandwiching portion extending toward the first leg portion, and
wherein the first sandwiching portion and the second sandwiching portion are expandingly opened by abutting the screw member inserted into the screw hole portion, or prevented from approaching with each other by abutting on the screw member.

2. The fastener of claim 1, wherein the first head portion extends from a distal end of the first leg portion toward the second leg portion,
wherein the second head portion extends from a distal end of the second leg portion toward the first leg portion, and
wherein one of the first head portion and the second head portion comprises the screw hole portion, and an other one of the first head portion and the second head portion comprises an insertion hole for the screw member inserted into the screw hole portion.

3. The fastener of claim 2, wherein the first head portion overlies the second head portion on a top side, and comprises the insertion hole that has a diameter larger than a diameter of the screw hole portion.

4. The fastener of claim 3, wherein the first head portion has a size larger than the second head portion so as to prevent the second head portion from lying off the first head portion when the fastener is inserted into the mounting hole.

5. The fastener of claim 3, further comprising:
a slit arranged to divide a hole edge that defines the screw hole portion in a circumferential direction.

6. The fastener of claim 5, wherein the second head portion comprises plural protruding portions protruding toward the connecting portion, and
wherein the plural protruding portions are arranged to protrude into the mounting hole when the fastener is attached to the first member.

7. The fastener of claim 1, wherein, as being expandingly opened by insertion of the screw member, the first sandwiching portion and the second sandwiching portion are engaged with a hole edge of the mounting hole on the back side.

8. The fastener of claim 2, wherein the second head portion comprises a concave portion more recessed toward the connecting portion than the flange, and
wherein the first head portion is disposed to overlie the concave par n thereabove on a top side of the second head portion.

9. A fastener that is attached to a mounting hole of a first member and to which a second member is attached using a screw member, the fastener comprising:
a first leg portion having elasticity;
a second leg portion having elasticity, and being provided to be opposed to the first leg portion;
a connecting portion connecting on end of the first leg portion and one end of the second leg portion;
a head portion comprising:
a flange to be engaged with an edge of the mounting hole on a topside thereof; and
a pressing surface to be pressed by a user, the head portion being disposed on other ends of the first leg portion and the leg portion so as to be opposed to the connecting portion; and
a screw hole portion into which the screw member is screwed, the screw hole portion being disposed in at least one of the connecting portion and the head portion,
wherein the first leg portion comprises a first engagement portion engageable with an edge of the mounting hole on a back side thereof,
wherein the second leg portion comprises a second engagement portion engageable with the edge of the mounting hole on the back side thereof,
wherein the head portion comprises:
a first head portion extending from first leg portion; and
a second head portion extending from the second leg portion so as to overlie the first head portion,
wherein, when the first leg portion and the second leg portion approach with each other, the first head portion and the second head portion relatively move in a state where the first head portion and the second head portion overlie with each other,
wherein the first head portion extends from a distal end of the first leg portion toward the second leg portion,
wherein the second head portion extends from a distal end of the second leg portion toward the first leg portion,
wherein one of the first head portion and the second head portion comprises the screw hole portion, and an other one of the first head portion and the second head portion comprises an insertion hole for the screw member inserted into the screw hole portion, and
wherein the second head portion overlies a back side of the first head portion, and is inclined such that a distal end of the second head portion is apart from the first head portion.

* * * * *